(12) United States Patent
Takahashi et al.

(10) Patent No.: US 8,273,302 B2
(45) Date of Patent: Sep. 25, 2012

(54) COMPONENT SEPARATION DEVICE

(75) Inventors: Makoto Takahashi, Osaka (JP); Masaya Nakatani, Hyogo (JP); Soichiro Hiraoka, Osaka (JP); Hiroshi Ushio, Osaka (JP); Akiyoshi Oshima, Osaka (JP)

(73) Assignee: Panasonic Corporation, Osaka (JP)

( * ) Notice: Subject to any disclaimer, the term of this patent is extended or adjusted under 35 U.S.C. 154(b) by 149 days.

(21) Appl. No.: 12/532,908

(22) PCT Filed: May 14, 2008

(86) PCT No.: PCT/JP2008/001199
§ 371 (c)(1),
(2), (4) Date: Sep. 24, 2009

(87) PCT Pub. No.: WO2008/142850
PCT Pub. Date: Nov. 27, 2008

(65) Prior Publication Data
US 2010/0126922 A1 May 27, 2010

(30) Foreign Application Priority Data

May 15, 2007 (JP) .................................. 2007-128921
May 15, 2007 (JP) .................................. 2007-128922

(51) Int. Cl.
*B01D 21/28* (2006.01)

(52) U.S. Cl. ............ 422/255; 422/22; 422/24; 422/128; 204/600; 204/643; 204/660; 204/661; 204/157.42; 210/201; 210/243; 210/523

(58) Field of Classification Search ............. 210/748.01, 210/748.05, 748.02, 201, 523, 188, 188.1, 210/222, 223, 208, 143, 137, 645, 243, 767, 210/708; 422/20, 186.04, 255, 82.05, 82.08, 422/128, 22, 24, 99, 101; 436/177, 63, 164, 436/172, 174; 435/4, 29; 209/18, 590, 155, 209/130; 204/547, 450, 600, 643, 555, 519, 204/157.42, 222, 223, 660, 661
See application file for complete search history.

(56) References Cited

U.S. PATENT DOCUMENTS
5,225,089 A * 7/1993 Benes et al. ............. 210/748.05
(Continued)

FOREIGN PATENT DOCUMENTS
JP 2001-525722 A 12/2001
(Continued)

OTHER PUBLICATIONS
Japanese Office Action for Application No. 2009-515085, May 17, 2011, Panasonic Corporation.
Supplementary European Search Report for EP 08 75 1717, Sep. 23, 2010.
Filip Petersson et al., "Free Flow Acoustophoresis: Microfluidic-Based Mode of Particle and Cell Separation", Analytical Chemistry, vol. 79, No. 14, pp. 5117-5123, Jul. 15, 2007, 2007 American Chemical Society.
(Continued)

*Primary Examiner* — Joseph Drodge
*Assistant Examiner* — Cameron J Allen
(74) *Attorney, Agent, or Firm* — RatnerPrestia

(57) ABSTRACT

A component separating device includes a flow channel, an acoustic wave generator for generating an acoustic wave in the flow channel, a first inlet channel for introducing a fist solution containing solid particles into the flow channel, a second inlet channel for introducing a second solution, and outlet channels for discharging a solution from the flow channel. A density grade generator is provided at the first inlet channel for forming a density grade of the solid particles. This component separating device extracts the solid particles into a high-purity solution at a high collecting rate.

26 Claims, 10 Drawing Sheets

U.S. PATENT DOCUMENTS

| | | | |
|---|---|---|---|
| 6,332,541 | B1 | 12/2001 | Coakley et al. |
| 6,929,750 | B2 * | 8/2005 | Laurell et al. ............... 210/708 |
| 2006/0035386 | A1 | 2/2006 | Hattori et al. |
| 2006/0037915 | A1 * | 2/2006 | Strand et al. ............... 210/748 |
| 2006/0163166 | A1 * | 7/2006 | Hawkes et al. ............... 210/748 |
| 2008/0000833 | A1 | 1/2008 | Peters et al. |
| 2009/0047297 | A1 | 2/2009 | Kim |

FOREIGN PATENT DOCUMENTS

| | | |
|---|---|---|
| JP | 2004-283828 A | 10/2004 |
| JP | 2004-354364 A | 12/2004 |
| JP | 2004-535912 A | 12/2004 |
| JP | 2005-319407 A | 11/2005 |
| JP | 2006-501994 A | 1/2006 |
| JP | 2008-510974 A | 4/2008 |
| WO | WO 02/072235 A1 | 9/2002 |
| WO | WO 2004/033087 A1 | 4/2004 |

OTHER PUBLICATIONS

Thomas Laurell et al., "Chip integrated strategies for acoustic separation and manipulation of cells and particles", Chem. Soc. Rev. 2007, vol. 36, No. 3, pp. 492-506, Mar. 15, 2007, The Royal Society of Chemistry 2007.

International Search Report for International Application No. PCT/JP2008/001199, Jul. 1, 2008, Panasonic Corporation.

Per Augustsson, Filip Petersson, Thomas Laurell, "Improved Carrier Medium Exchange Efficiency in Acoustic Standing Wave Particle Washing", The $10^{th}$ International Conference on Miniaturised Systems for Chemistry and Life Sciences, 2006, pp. 627-629.

Thomas Laurell, Filip Petersson, Andreas Nilsson, "Chip integrated strategies for acoustic separation and manipulation of cells and particles", Chemical Society Reviews, 2007.03, 36, 3, pp. 492-506.

Japanese Office Action for 2009-515085 mailed Feb. 28, 2012.

* cited by examiner

COMPONENT SEPARATION DEVICE

This Application is a U.S. National Phase Application of PCT International Application PCT/JP2008/001199.

TECHNICAL FIELD

The present invention relates to a component separating device which extracts and separates solid particles from mixture solution, such as cell culture, blood, or latex, containing the solid particles and liquid.

BACKGROUND ART

Cells generate gene or protein, and controls biogenic activities, such as controlling over metabolic product, immunity system, proliferating differentiation. Research on or analysis of the cells is thus ever progressing not only for clearing up the mechanism of biological reaction but also for advancing the medical diagnosis.

Cells preserved in a culture solution are often extracted into a test solution for analyzing the cells with a centrifugal separator or a pipette. However, this method with those devices is a time-consuming job, and the cells may brake during the centrifugal separation, so that precious cells and an expensive culture solution in great quantity are consumed more than a necessary amount of the culture.

To overcome the foregoing problem, a device produced by a Micro Electro Mechanical System (MEMS) technology is developed. Among devices produced by the MEMS technology, a device employing acoustic waves can handle the cells without contact, and includes a small sound source with a piezoelectric element which is easily controlled. Patent Document 1 discloses a cell pretreatment in which a device employing acoustic waves. The cell pretreatment extracts a mixture solution containing cells and first solution simultaneously are introduced in a flow channel having a separation function. Non-Patent Document 1 discloses cells are extracted into second solution with acoustic waves. Another citation discloses that an inlet channel for the second solution and an outlet channel for the first solution having the cell extracted are connected continuously to a flow channel having an extracting function.

FIG. 15 is a plan view of a conventional component separating device disclosed in Non-Patent Document 1 for illustrating a method of extracting solid particles with the conventional device. As shown in FIG. 15, mixture solution containing solid particles 120 and first solution 123 are put into first inlet channel 103 along direction 130. Simultaneously to this, second solution 124 is put into second inlet channel 104 along direction 131. An acoustic wave produced by acoustic-wave generator 111 is transmitted to flow channel 102, thereby generating a standing wave having node 138 existing at the center of flow channel 102.

Radiation pressure from the acoustic wave causes the standing wave to apply, to solid particles 120, a force directed toward the center of flow channel 102, so that solid particles 120 move from a flow of first solution 123 into a flow of second solution 124, i.e. particles 120 are extracted from first solution 123 into second solution 124. Then, outlet channel 105 discharges mixture solution containing second solution 124 and extracted solid-particles 120 along direction 132, and allows first solution 123 and remaining particles 120 which are not extracted into second solution 124 to flow out along direction 133.

However, although an effort is directed toward extracting solid particles 120 as many as possible by using the foregoing conventional device, the dispersion in position of particles 120 with respect to the width direction of second inlet channel 104 as well as the dispersion in size of individual particles 120 prevents particles 120 from being completely extracted into second solution 124.

Patent Document 1: JP2004-535912A
Non-Patent Document 1: Per Augustsson et al., µTAS 2006, pages 627-629

SUMMARY OF INVENTION

A component separating device includes a flow channel, an acoustic wave generator for generating an acoustic wave inside the flow channel, a first inlet channel, a second inlet channel, and plural outlet channels. A density grade generator provided at the first inlet channel can form a density grade of solid particles is in the first inlet channel. The density grade generator is provided at the first inlet channel. The acoustic wave generator is provided in the flow channel. The second inlet channel is connected to the flow channel. This structure provides the component separating device and a method for extracting or separating the solid particles efficiently, and achieving a high collecting percentage of solid component.

REFERENCE NUMERALS

1 Substrate
2, 2a, 2b Flow Channel
3 First Inlet Channel
4 Second Inlet Channel
5, 5a, 5b First Outlet Channel
6 Second Outlet Channel
7, 7a, 7b Branching Section
8, 8a, 8b Inlet Aperture
10 Sealing Cover
11 Acoustic Wave Generator
12 Density Grade Generator
13 First Electrode Layer
14 Piezoelectric Layer
15 Second Electrode Layer
20 Solid Particle
20a First Solid Particle
20b Second Solid Particle
23 First Solution
24 Second Solution

DETAIL DESCRIPTION OF PREFERRED EMBODIMENTS

Exemplary Embodiment 1

Figure 1:
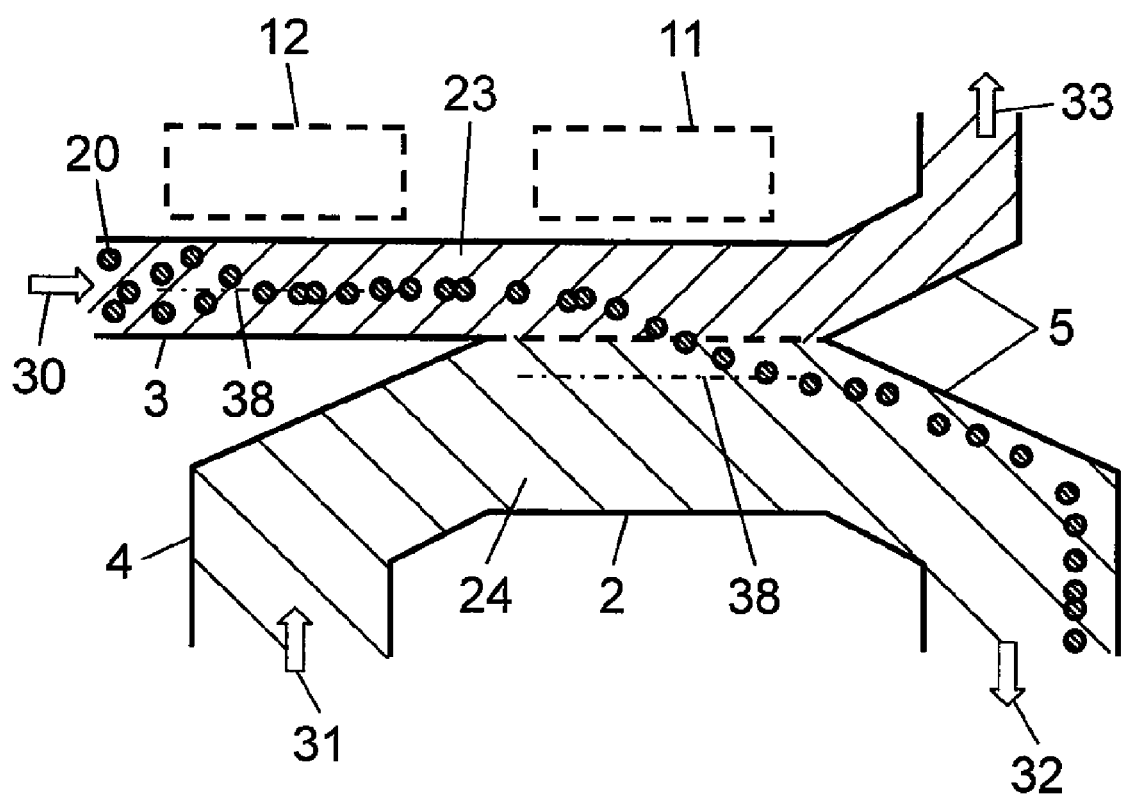
FIG. 1 is a plan view of a component separating device in accordance with Exemplary Embodiment 1 of the present invention.
Figure 2:
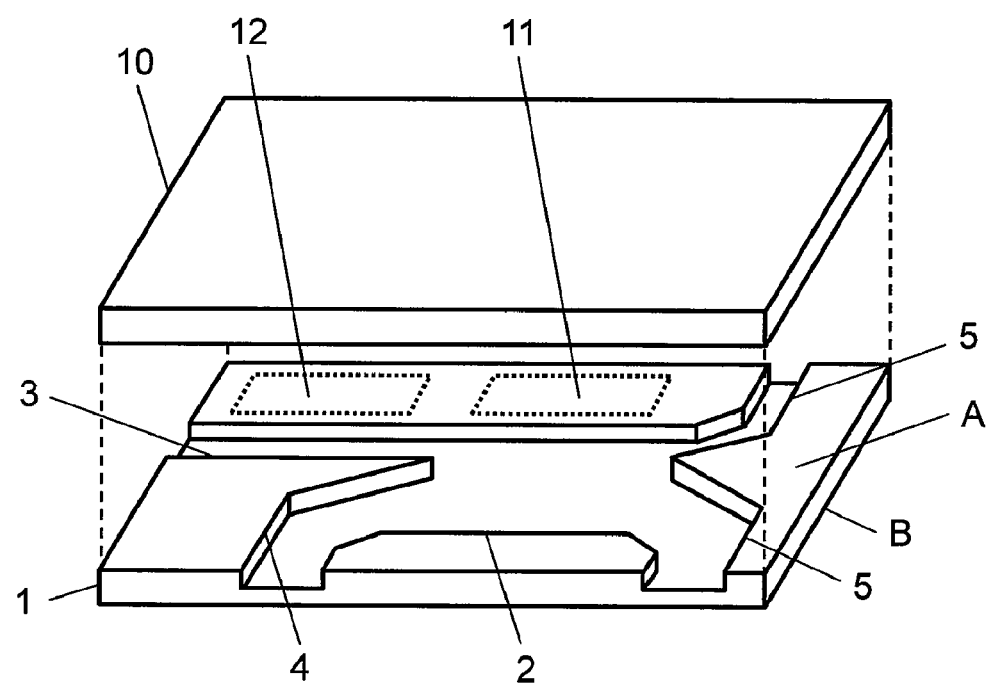
FIG. 2 is a perspective exploded view of the component separating device in accordance with Embodiment 1 of the invention.
Figure 3:
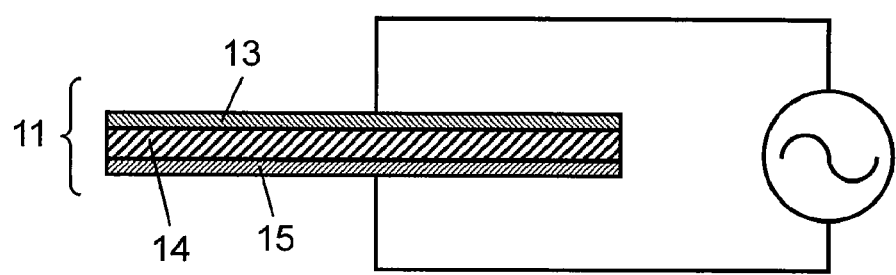
FIG. 3 is a sectional view of an acoustic wave generator of the component separating device in accordance with Embodiment 1 of the invention.

A component separating device and a component separating method with the device in accordance with Exemplary Embodiment 1 of the present invention will be described below with reference to the accompanying drawings. FIG. 1 is a plan view of the component separating device in accordance with Embodiment 1 of the invention. FIG. 2 is a perspective exploded view of the component separating device shown in FIG. 1. FIG. 3 is a sectional view of acoustic wave generator 11. The same components are denoted by the same reference numerals.

As shown in FIG. 2, reference numerals 1 denotes a substrate made of silicon. Flow channel 2 having a predetermined width and a predetermined depth is formed in surface A (an upper surface) of substrate 1. Acoustic wave generator 11 which generates an acoustic wave in flow channel 2 is provided on surface B (a lower surface) of substrate 1. This structure is provides high productivity due to acoustic wave generator 11 provided on the lower surface. Sealing cover 10 is formed on the surface A, and hence the surface A preferably has a flat surface. Acoustic wave generator 11 is formed by a thin-film forming process on the surface B, and hence, acoustic wave generator 11 is provided the surface B which is flat.

Acoustic wave generator 11 can be formed on the surface A or a side surface of substrate 1 as long as generator 11 can generate an acoustic wave inside flow channel 2.

The acoustic wave generated by acoustic wave generator 11 is radiated into flow channel 2 so as to generate a standing wave in liquid flowing in flow channel 2.

The width W of flow channel 2 and the velocity v of the acoustic wave in solution to be put in the flow channel 2 provides the frequency f of the acoustic wave by the following formula:

$f=(n/2) \times v/W$, where n is a natural number.

Upon being radiated into flow channel 2, the acoustic wave having the frequency f repetitively reflects inside channel 2 and are superposed one another, thereby generating the standing wave in flow channel 2. If solid particles 20 are suspended in this solution, solid particles 20 concentrate to node 38 of the standing wave and its vicinity.

Flow channel 2 is sealed with sealing cover 10 made of glass by an anodic bonding method. The glass allows a user to monitor the movement of solid particles 20 from above while the user adjusts the device to separate the component. Sealing cover 10 can be made from resin or silicon by a bonding method appropriately chosen according to material of cover 10.

As shown in FIG. 1, first inlet channel 3 for introducing and second inlet channel 4 for introducing second solution 24 are connected to flow channel 2. First solution 23 contains solid particles 20. Flow channel 2 further includes first outlet channels 5 for discharging the solutions from channel 2. In the case that substrate 1 is made from silicon, grooves of channels 2, 3, 4 and 5 can be formed by a photolithography method or a dry-etching method, thereby providing the component separating device having accurate dimensions efficiently.

Substrate 1 is made from silicon which allows flow channel 2 to be formed accurately; however, substrate 1 can be made from another material, such as plastics or glass, as long as the acoustic wave is transmitted through substrate 1.

An acoustic wave generator is provided on surface B of substrate 1, and functions as density grade generator 12 which forms a density grade of solid particles 20 flowing through first inlet channel 3. This acoustic wave generator generates the density grade of solid particles 20 in first inlet channel 3 by the same method as acoustic wave generator 11 provided at flow channel 2. Density grade generator 12 can employ any method for forming a density grade of solid particles 20 within inlet channel 3. For example, density grade generator 12 can employ electrophoresis with an electrode placed at a position affecting particles 20 within channel 3, or can include a pillar or a branch channel for restricting a direction of particles 20 flowing in inlet channel 3.

The above structures form the density grade of solid particles 20 in first inlet channel 3 and reduce positional dispersion of particles 20 in a width direction of first inlet channel 3. This operation facilitates extracting and separating the component in channel 2 efficiently and reliably, thus providing the component separating device with a high collecting rate.

Density grade generator 11 implemented by the acoustic wave generator has advantages that generator 11 can affect particles 20 without contacting the particles and form the density grade at a predetermined position under electrical control with a simple structure.

Acoustic wave generator 11 and density grade generator 12 can be implemented commonly by a single acoustic wave generator; however, generators 11 and 12 preferably control acoustic waves independently from each other, thereby extracting and separating solid particles 20 appropriately. For instance, first inlet channel 3 and flow channel 2 are different in width, and thus, the frequencies of the standing waves to be generated in channels 2 and 3 are different, thus being preferably controllable independently. Further, the amounts of solution 23 and solution 24 are preferably controllable independently, thereby extracting and separating the component efficiently.

FIG. 3 shows the structure of the acoustic wave generator functioning as acoustic wave generator 11 or density grade generator 12. Density grade generator 12 generating an acoustic wave can have the structure identical to that of generator 11. As shown in FIG. 3, this acoustic wave generator is a piezoelectric actuator having a layered structure including first electrode layer 13, piezoelectric layer 14, and second electrode layer 15. Acoustic wave generator 11 having a small size and accurate dimensions can be formed by a thin-film forming method on a surface of the silicon substrate on having channels, such as flow channel 2, provided therein, thus easily providing the component separating device with a small size.

Figure 4A:
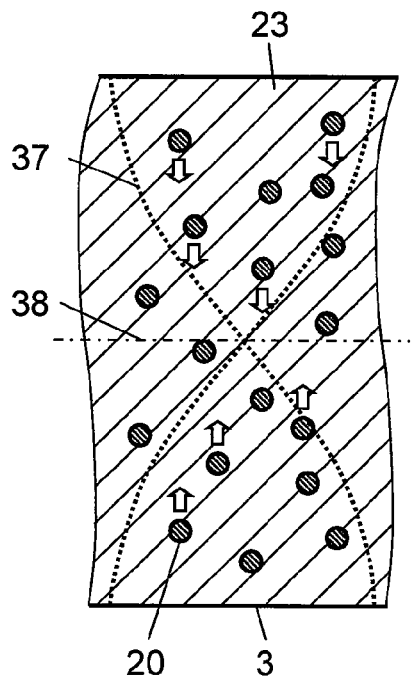
FIG. 4A is a sectional view of an inlet channel of the component separating device in accordance with Embodiment 1 of the invention.
Figure 4B:
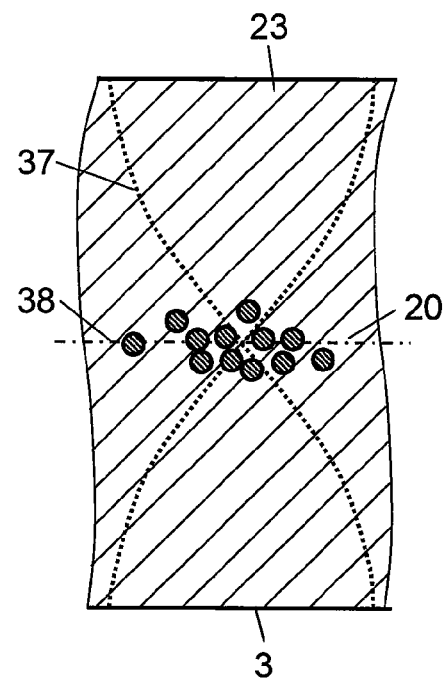
FIG. 4B is a sectional view of the inlet channel of the component separating device in accordance with Embodiment 1 of the invention.
Figure 5A:
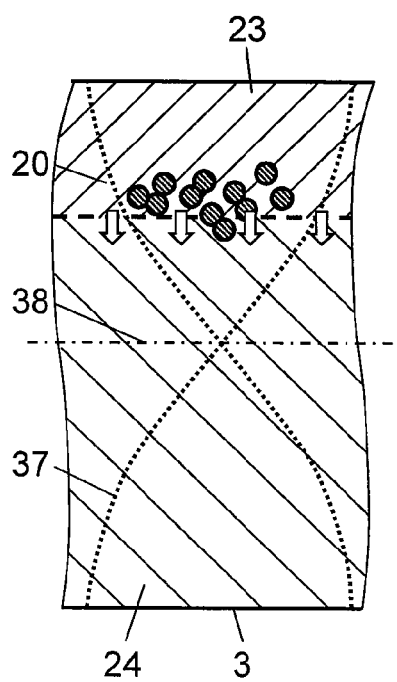
FIG. 5A is a sectional view of a flow channel of the component separating device in accordance with Embodiment 1 of the invention.
Figure 5B:
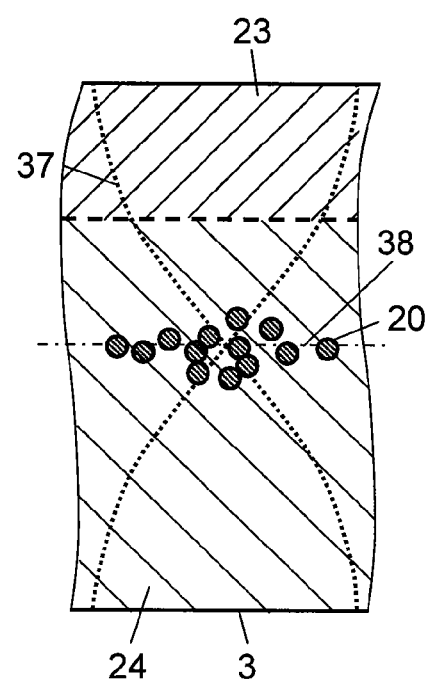
FIG. 5B is a sectional view of the flow channel of the component separating device in accordance with Embodiment 1 of the invention.

A method of extracting solid particles 20 with this component separating device will be described below with reference to FIGS. 1, 4A, 4B, 5A, and 5B. Density grade generator 12 is implemented by the acoustic wave generator. FIGS. 4A and 4B are sectional views of the inlet channel of the component separating device in accordance with Embodiment 1. FIGS. 5A and 5B are sectional views of the flow channel of the component separating device in accordance with Embodiment 1.

As shown in FIG. 1, mixture solution of first solution 23 and solid particles 20 is introduced with a solution supplier into first inlet channel 3 along direction 30. Particles 20 are mixed homogeneously in solution 23. As shown in FIG. 4A, the acoustic wave generator functioning as density grade generator 12 is driven so as to generate node 38 of the standing wave at the center of first inlet channel 3. The standing wave applies a radiation pressure to particles 20 flowing in the inlet channel toward the center of first inlet channel 3, and causes particles 20 to concentrate to node 38 and its vicinity where the radiation pressure of the acoustic wave is smallest. In this case, node 38 is located on the center line of channel 3, particles 20 concentrating onto the center line, as shown in FIG. 4B. In other words, the radiation pressure of the acoustic wave causes solid particles 20 to form a density grade in which a higher density is provided on the center line.

Solid particles 20 together with first solution 23 are introduced into flow channel 2 while the density grade formed in first inlet channel 3 is maintained. Second solution 24 is introduced into second inlet channel 4 with a solution supplier (not shown) along direction 31. At this moment, it is essential that flow channel 2 is located such that node 38 is located within the flow of second solution 24. In order to achieve this structure, it is necessary to adjust the shape of the flow channels and the amount of the introduced solutions, and to design an overall structure of acoustic wave generator 11 accordingly.

FIGS. 5A and 5B are sectional views of the flow channel of the component separating device in accordance with Embodiment 1. As shown in FIG. 5, acoustic wave generator 11 is driven to generate node 38 of the standing wave at the center of flow channel 2. The radiation pressure of the acoustic wave causes solid particles 20 to flow toward node 38 of the standing wave, namely, toward the center line of flow channel 2, thus causing particles 20 to move from first solution 23 to second solution 24, as shown in FIG. 5B.

First solution 23 and second solution 24 having solid particles 20 move from first solution 23 to second solution 24 flows to first outlet channels 5 provided at downstream of flow channel 2.

The shapes and lengths of first outlet channels 5 are designed appropriately to cause second solution 24 containing solid particles 20 to be discharged along direction 32 and to cause first solution 23 to be discharged along direction 33 separately from second solution 24.

As discussed above, the density grade of solid particles 20 suspended in first solution 23 is formed in first inlet channel 3, and then, particles 20 are extracted and moved from first solution 23 to second solution 24, thereby arrange particles 20 precisely. This operation reduces a variation of moving distances of particles 20, hence allowing particles 20 to be extracted accurately and continuously in a short period of time.

The component separating device used for separating and extracting cells from culture solution containing the cells will be described below. In this case, particles 20 correspond to the cells, first solution 23 corresponds to the culture solution of the cells, and second solution 24 corresponds to extracellular liquid. The extracellular liquid is electrolytic solution containing about 4 mM of $K^+$ ion, about 145 mM of $Na^+$ ion, and about 123 mM of $Cl^-$ ion This electrolytic solution is often used for measuring electrophysiologic phenomenon of cells.

The cells preserved in culture solution can be active for a long period of time. However, the culture solution contains a large number of unidentifiable ions, so that the electrophysiologic phenomenon of the cells in the culture solution cannot be measured accurately. An accurate measurement of the electrophysiologic phenomenon requires the cells to be extracted into the extracellular liquid. However the cells existing in the extracellular liquid lose its activity gradually, so that it is essential to quickly extract a necessary amount of the cells for the measurement.

The component separating device according to Embodiment 1 separates and extracts the cells from the culture solution, and quickly moves the cells from in the culture solution to in the extracellular liquid, so that the electrophysiologic phenomenon of the cells can be measured accurately while the activity of the cells maintained.

Adherent cells, such as HEK cells or CHO cells, adhere to a culture container. In order to measure electrophysiologic phenomenon of the adherent cells, the cells is required to remove from the container with tryptic solution, which reduces the activity of the cells. The adherent cells thus are required to be extracted into the culture solution or the extracellular liquid quickly after the cells are removed from the container.

The component separating device can extract and separate the cells as solid particles 20 from the tryptic solution as first solution 23 to the culture solution or the extracellular liquid or the extracellular solution as second solution 24. The cells removed from the container can be suspended and preserved in the culture solution by agitating the culture solution while the activity of the cells maintained. The cells can be extracted into the extracellular liquid, and can be promptly measured in electrophysiologic phenomenon.

Figure 6:
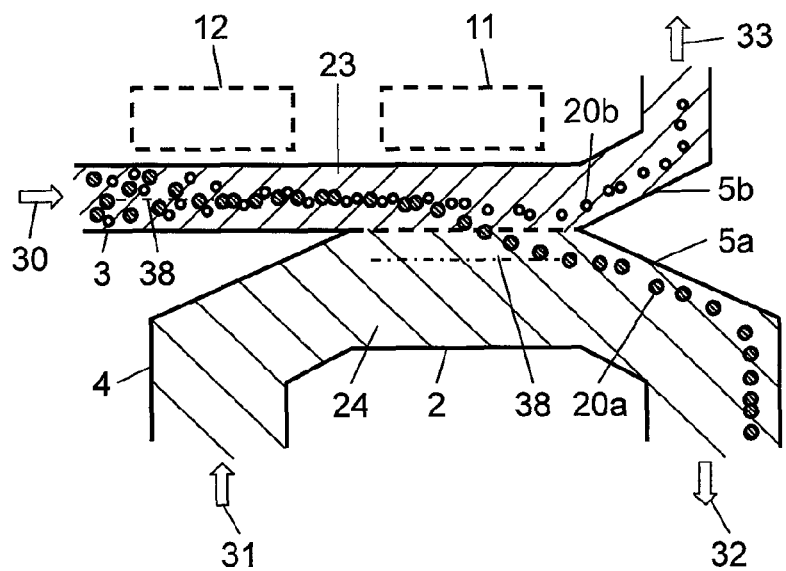
FIG. 6 is a plan view of the component separating device in accordance with Embodiment 1 of the invention.

Another component separating device and a separating method with the device in accordance with Embodiment 1 will be described below with reference to the accompanying drawings. FIG. 6 is a plan view of this component separating device in accordance with Embodiment 1 for illustrating a method for separating only specific solid component 20 (e.g. solid particles 20a) selectively from a solution containing solid particles 20a and 20b having sizes different from each other. The acoustic wave generator is used as density grade generator 12.

As shown in FIG. 6, first solid particles 20a susceptible to the acoustic wave and second solid particles 20b less susceptible to the acoustic wave are mixed in first solution 23, which is then transmitted into first inlet channel 3 with a solution supplier (not shown) along direction 30. Mixed particles 20a and 20b, such as erythrocyte and leucocyte in blood, may be required to separate selectively from each other for test and analysis.

Density grade generator 12 is driven to generate node 38 of the standing wave at the center of first inlet channel 3 so as to increase the densities of both particles 20a and 20b locally at the center of first inlet channel 3. First solid particles 20a first concentrate to the center line of channel 3. After that, second solid particles 20b concentrate to the center line. First solid particles 20a and second solid particles 20b are eventually introduced together with first solution 23 into flow channel 2 while the density grade is maintained.

Second solution 24 is introduced into second inlet channel 4 with a solution supplier (not shown) along direction 31.

Acoustic wave generator 11 is driven to generate a node of the standing wave at the center of flow channel 2. A pressure of the acoustic wave causes first solid particles 20a and second solid particles 20b to move toward node 38 of the standing wave, namely, toward the center of flow channel 2. In general, a solid particle having a larger volume is more susceptible to the acoustic wave. An output of acoustic wave generator 11 is adjusted such that only first solid particles 20a each having a volume larger than each second solid particle 20b is affected by the acoustic wave and flow to the center line of flow channel 2 while flowing in channel 2. In other words, the output of acoustic wave generator 11 is adjusted such that second solid particles 20b each having a volume than each first solid particle 20a dos not move to the center line of the flow channel while particle 20a is affected by the acoustic wave during the flow in channel 2. Only first solid particles 20a thus move from first solution 23 into second solution 24. First solution 23 containing second solid particles 20b is led into first outlet channel 5b while second solution 24 containing first solid particles 20a is branched and led into first outlet channel 5a. The shapes and lengths of first outlet channels 5a and 5b are designed appropriately so as to efficiently discharging second solution 24 and first solid particles 20a along direction 32 and to efficiently discharge first solution 23 and second solid particles 20b along direction 33.

As discussed above, the device shown in FIG. 6 forms the density grade of first solid particles 20a and second solid particles 20b in first inlet channel 3, and extracts only first solid particles 20a from first solution 23 into second solution 24 in flow channel 2 connected to first inlet channel 3. This process reduces the variation of moving distances of first solid particles 20a, accordingly separating and extracting solid particles 20a and 20b continuously at a high collecting rate.

This component separating device can be used to extract and separate cells having different sizes as first solid particles 20a and second solid particles 20b from each other. For instance, erythrocyte and leucocyte in blood are different in shape and size from each other, and have different characteristics to the acoustic wave. This component separating device can be used for separating and extracting only one of erythrocyte or leucocyte from the blood. Alternatively, cultured cells have different sizes and thus, are different in characteristics to the acoustic wave depending on a time elapsing after cell division or cell agglutination even if the cells are homogeneous. The uniformity of the shapes of the cells may affect an accuracy of measuring the cells during the analysis. The component separating device can separate and extract only the cells uniform in shape from the culture solution of these cells.

The component separating device shown in FIG. 6 and the separating method with the device can separate and extract only outstanding cells from cells different from one another in shape and size accurately for a short period of time. The device and the method thus can improve a measuring accuracy and a measuring speed during the analysis of cells.

Exemplary Embodiment 2

Figure 7:
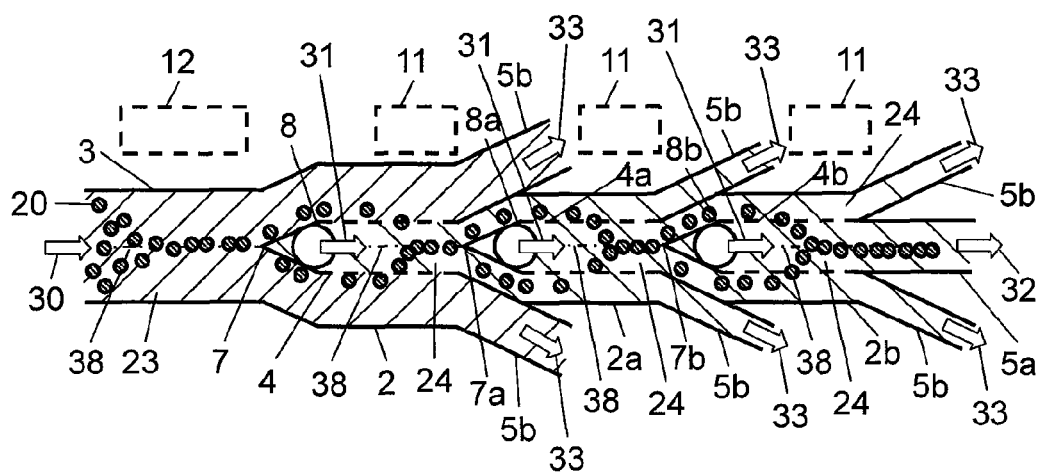
FIG. 7 is a plan view of a component separating device in accordance with Exemplary Embodiment 2 of the invention.

A component separating device in accordance with Exemplary Embodiment 2 of the present invention will be described below with reference to the accompanying drawings. FIG. 7 is a plan view of the component separating device in accordance with Embodiment 2.

As shown in FIG. 7, branching section 7 is provided at a region in first inlet channel 3 having solid particles 20 distributed at a high density. Inlet aperture 8 and second inlet channel 4 are provided between first inlet channels 3 branched at branching section 7. Second inlet channel 4 and branched first inlet channels 3 are connect with flow channel 2. This structure allows first solution 23 introduced from first inlet channel 3 to flow together with second solution 24 introduced from second inlet channel 4 in flow channel 2 such that second solution 24 contacts the region in first solution having solid particles 20 distributed at the higher density.

This structure allows second solution 24 to join in a vicinity of the area where particles 20 have the higher density. This structure reduces moving distances of particles 20 necessary to separate and extract particles 20 for a short period of time, thus separating and extracting particles 20 efficiently. The branched flows are joined into flow channel 2, thereby reducing loss of particles 20. Further, this structure easily causes the flow of first solution 23 to contact both sides of second solution 24, hence separating and extracting a large number of solid particles 20 with an even small amount of second solution 24.

Next, as shown in FIG. 7, plural stages each of which is the above structure as a stage are connected in series to execute the above operation repetitively. That is, at the next stage, second branching section 7a is provided on the center line where solid particles 20 concentrate to have a density grade in flow channel 2, and second solution 24 is introduced from second inlet aperture 8a and flows in third inlet channel 4a. The flow of solid particles 20 and second solution 24 join together and flow in second flow channel 2a. Then, solid particles 20 concentrate again on the center line by acoustic wave generator 11. Then, at a further stage, third branching section 7b is provided on the center line where solid particles 20 concentrate to have a density grade at second flow channel 2a, and second solution 24 is introduced from third inlet aperture 8b and flows in fourth inlet channel 4b. The above operation is thus executed repetitively to reduce the amount of first solution 23 flowing into second solution 24 and to increase the amount of the second solution, accordingly separating and extracting the particles purely and easily.

Exemplary Embodiment 3

Figure 8:
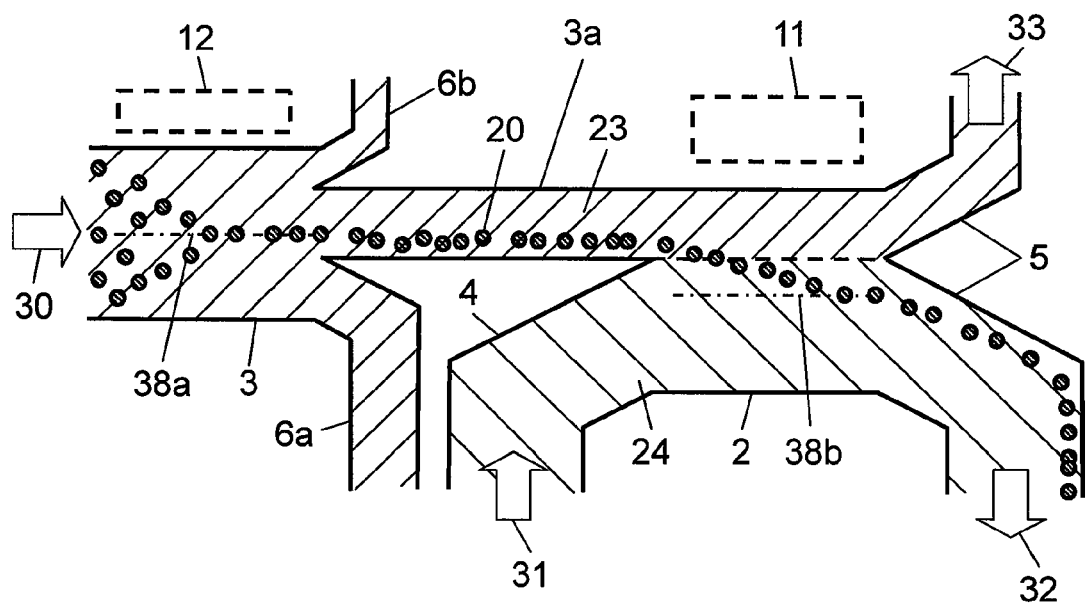
FIG. 8 is a plan view of a component separating device in accordance with Exemplary Embodiment 3 of the invention.
Figure 9:
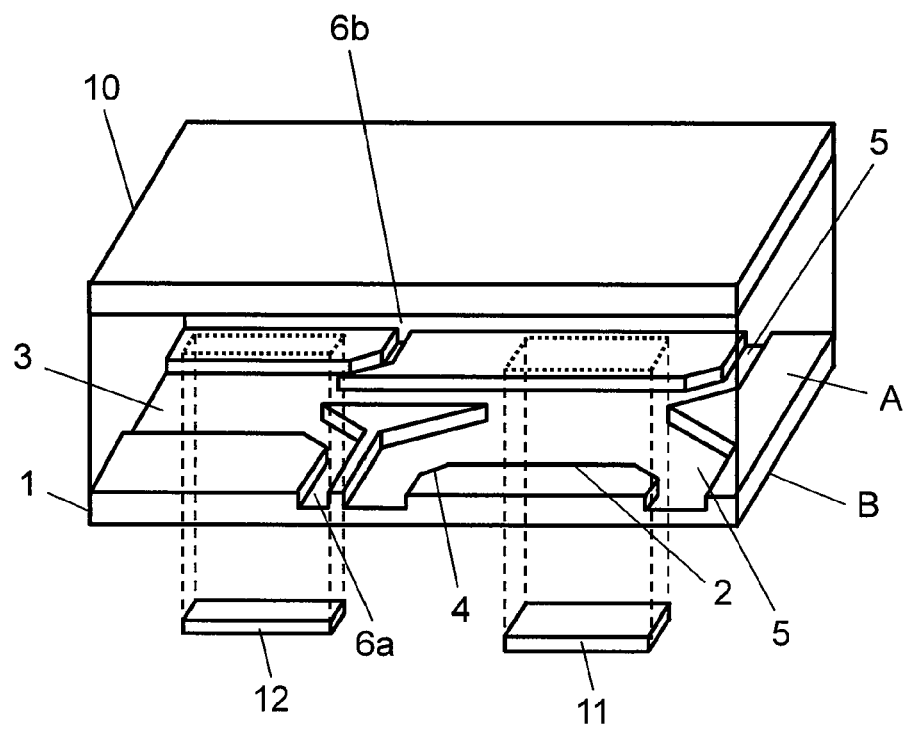
FIG. 9 is a perspective exploded view of the component separating device in accordance with Embodiment 3 of the invention.

A component separating device and a separating method with the device in accordance with Exemplary Embodiment 2 of the present invention will be described below with reference to the accompanying drawings. FIG. 8 is a plan view of the component separating device in accordance with Embodiment 3. FIG. 9 is an exploded perspective view of the device.

As shown in FIGS. 8 and 9, reference numeral 1 denotes a substrate made from silicon. Flow channel 2 having a predetermined width and a predetermined depth is formed in a first surface of substrate 1. Acoustic wave generator 11 which generates an acoustic wave in flow channel 2 is formed on the other surface of substrate 1. This structure provides the device with high productivity. Since sealing cover 10 is provided on the first surface, the first surface is flat preferably. Since acoustic wave generator 11 is formed on the other surface by a thin-forming film process, generator 11 is formed preferably on the other surface which is flat with no channel formed therein.

The acoustic wave generated by acoustic wave generator 11 is radiated into flow channel 2 so as to generate a standing wave in liquid flowing through channel 2. This standing wave is controlled to separate and extract solid particles 20.

The width W of flow channel 2 and the velocity v of the acoustic wave in solution to be put in the flow channel 2 provides the frequency f of the acoustic wave by the following formula:

$$f=(n/2) \times v/W, \text{ where n is a natural number.}$$

Upon being radiated into flow channel 2, the acoustic wave having the frequency f repetitively reflects inside channel 2 and are superposed one another, thereby generating the standing wave in flow channel 2. If solid particles 20 are suspended in this solution, solid particles 20 concentrate to node 38b of the standing wave and its vicinity. Acoustic wave generator 11 can be formed on the first surface or a side surface of substrate 1 as long as the acoustic wave can be generated in flow channel 2.

An upper surface of flow channel 2 is sealed by an anodic bonding method with sealing cover 10 made of glass. The glass allows a user to monitor the movement of solid particles 20 from above while the user adjusts a flow amount or an intensity of the acoustic wave and an optimum separation of the component. Sealing cover 10 can be made from plastics or silicon. The bonding method can be selected appropriately according to the material of the cover.

First inlet channel 3 for introducing first solution 23 that contains solid particles 20 and second inlet channel 4 for introducing second solution 24 are connected to flow channel 2. First inlet channel 3 introduces first solution 23 containing solid particles 20, and is equipped with density grade generator 12 for arranging particles 20 at a predetermined position. As shown in FIG. 2, an acoustic wave generator proved on the other surface of substrate 1 functions as density grade generator 12 for forming the density grade of solid particles 20. A method for forming the density grade with this acoustic wave generator is similar to the operation of acoustic wave generator 11 provided to flow channel 2, so that the density grade of solid particles 20 can be formed in first inlet channel 3.

Density grade generator 12 can employ any method of forming the density grade of solid particles 20 within inlet channel 3, e.g. can employ electrophoresis with an electrode placed at a position affecting particles 20 within channel 3.

Second outlet channel 6 removes a portion of first solution 23 which does not contain solid particles 20, and thus, increases the density of solid particles 20, accordingly reduces the amount of second solution 24.

In FIG. 8, the device has two second outlet channels 6; however, can have at least one outlet channel 6. Plural channels 6 sends first solution 23 having a high density of solid particles 20 to flow channel 2. In first inlet channel 3, density grade generator 12 forms the density grade of particles 20, and a surplus portion of first solution 23 is discharged from second outlet channel 6. This operation reduces moving distances of particles 20 and a variation of the positions of particles 20 in a width direction of first inlet channel 3. Solid particles 20 can be separated and extracted efficiently and reliably in another flow channel 2 having another acoustic wave generator 11, thus providing the component separating device with a high collecting rate.

Second inlet channel 4 introduces second solution 24 to disperse extracted solid particles 20. At least one second outlet channel 6 is provided on the same side surface as second inlet channel 4 easily forms an interface in channel 2 on which interface first solution 23 containing particles 20 at a high density contact second solution 24 introduced from second inlet channel 4. This structure reduces moving distances of solid particles 20, and separates and extracts particles 20 into second solution 24.

That is, as shown in FIG. 8, inlet channel 3 is branched into branch channel 6a (outlet channel 6), main channel 3a, and branch channel 6b. Branch channel 6a is formed in the same side surface as second inlet channel 4. Main channel 3a is connected with flow channel 2. Branch channel 6b having one end directed in a lateral direction. Main channel 3a out of these channels has an area on the center line where solid particles 20 concentrate at higher density. A branching point between branch 6a and main channel 3a is located slightly deviating from the center line of inlet channel 3. The solution flowing through main channel 3a flows into flow channel 2 while the higher density of particles 20 flows closer to the side surface of main channel 3a having inlet channel 4 provided therein.

At the position that main channel 3a is connected with flow channel 2, inlet channel 4 has a larger width than main channel 3a. A node of an acoustic wave generated by acoustic wave generator 11 is located on the center line of flow channel 2. The node is thus located in flow channel 3 closer to the side surface having inlet channel 4 connected thereto. Solid particles 20 move toward this node. Since the portion having the higher density of particles 20 approximates to the side surface of main channel 3a having inlet channel 4 connected thereto, particles 20 can moves by a short distance.

Next, at least two first outlet channels 5 are provided for discharging respective solutions. One first outlet channel 5 out of channels 5 collects first solution 23 in which particles 20 have been dispersed. Another first outlet channel 5 collects second solution 24 having particles 20 moving thereinto in flow channel 2. That is, the one first outlet channel 5 for discharging first solution 23 has the same width as main channel 3a, and the other outlet channel 5 for discharging second solution 24 has the same width as inlet channel 4. Solid particles 20 concentrating to the center line of flow channel 2 is led into the outlet channel having the larger width, i.e. into the outlet channel for discharging the second solution.

Exemplary Embodiment 4

Figure 10:
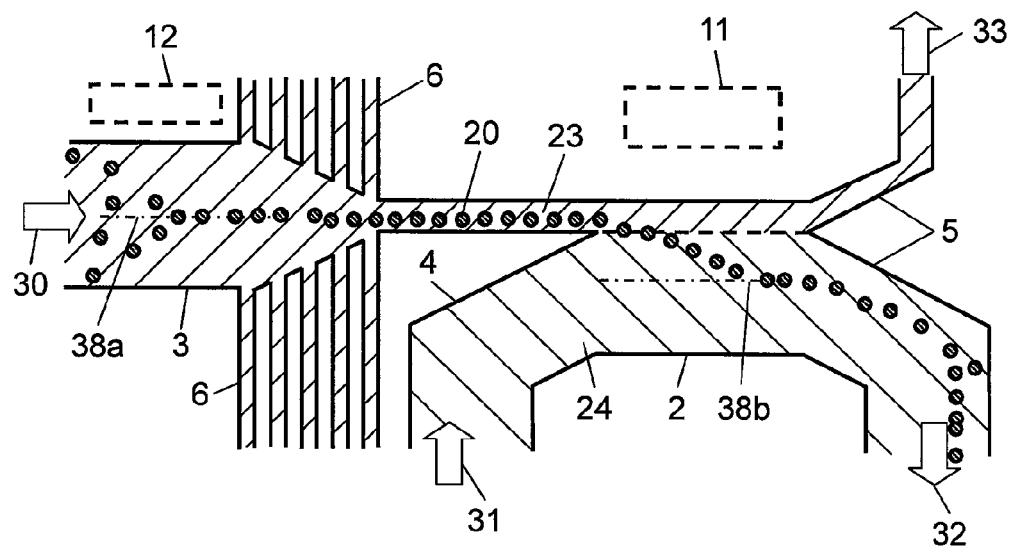
FIG. 10 is a plan view of a component separating device in accordance with Exemplary Embodiment 4 of the invention.

A component separating device in accordance with Exemplary Embodiment 4 will be described below with reference to FIG. 10. FIG. 10 is a plan view the component separating device. The device according to this embodiment includes a large number of second outlet channels. As shown in FIG. 10, an inner diameter of each second outlet channel 6 is smaller than an outer diameter of solid particles 20, so that particles 20 failed concentrating appropriately can be prevented from flowing out through each channel 6.

Plural outlet channels 6 efficiently discharge first solution 23. In particular, channels 6 can be placed along a slope. This structure increases the density of particles 20 in first solution 23 to be sent to flow channel 2.

Exemplary Embodiment 5

Figure 11:
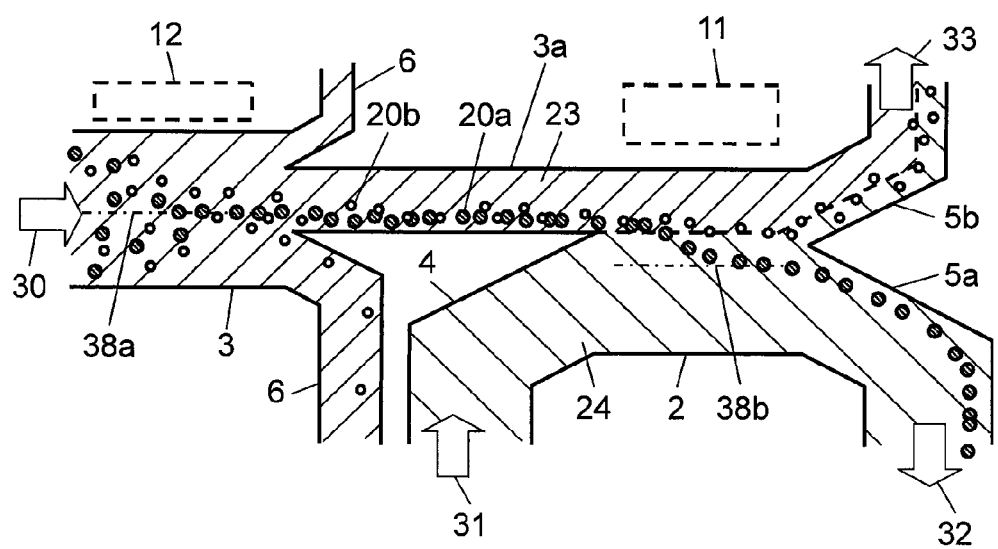
FIG. 11 is a plan view of a component separating device in accordance with Exemplary Embodiment 5 of the invention.

A component separating device according to Embodiment 5 will be described below with reference to FIG. 11. FIG. 11 is a plan view of the component separating device. FIG. 11 illustrates a method of selectively separating particular solid particles only, e.g. selectively separating particles 20a from solution containing solid particles 20a and 20b different in size from each other. According to Embodiment 5, first solid particles 20a more susceptible to the acoustic wave than second solid particles 20b and second solid particles 20b less susceptible to the acoustic wave are mixed. The device includes a density grade generator implemented by an acoustic wave generator.

The device according to Embodiment 5 shown in FIG. 11 has a structure basically similar to that of Embodiment 3 shown in FIGS. 8 and 9. The device according to Embodiment 5 is different from the device of Embodiment 3 in a structure for separating between particles 20a each having a larger volume from particles 20b each having a smaller volume. This structure is basically similar to the structure used in another device according to Embodiment example 1 for separating two types of solid particles from each other.

That is, density grade generator 12 is driven to generate node 38 of a predetermined standing wave at the center of first inlet channel 3 so as to increasing respective densities of both particles 20a and 20b. First solid particles 20a first concentrate to the center line of channel 3. After that, second solid particles 20b concentrate to the center line. First solid particles 20a and second solid particles 20b are eventually introduced together with first solution 23 into flow channel 2 while their density grades are maintained. First solution 23 containing few solid particles is discharged outside through second outlet channels 6 provided in both side surfaces of channel 3. Second solution 24 is introduced into second inlet channel 4 with a solution supplier (not shown) along direction 31.

Acoustic wave generator 11 is driven to generate a node of a standing wave at the center of flow channel 2. Then, a radiation pressure of the acoustic wave affects both of first solid particles 20a and second solid particles 20b to move toward node 38 of the standing wave, namely, toward the center of flow channel 2.

In general, a solid particle having a larger volume is more susceptible to the acoustic wave. An output of acoustic wave generator 11 is adjusted such that only first solid particles 20a having a larger volume than second solid particles 20b can be affected by the acoustic wave and can flow to the center line of flow channel 2 during the flow in channel 2. In other words, the output of acoustic wave generator 11 is adjusted such that second solid particles 20b having a smaller volume than first solid particles 20a do not reach the center line of flow channel 2 while being affected by the acoustic wave during the flow in channel 2. Only first solid particles 20a are thus move from first solution 23 into second solution 24.

Solid component 20b, however, moves toward the center line as whole. Outlet channel 5b for discharging first solution 23 has a larger width than main channel 3a of the inlet channel, and has a smaller width than outlet channel 5a for discharging second solution 24. Outlet channels 5a and 5b are designed in shape and length appropriately so as to efficiently discharge first solid particles 20a along direction 32 together with second solution 24, and to efficiently discharge second solid particles 20b together with first solution 23 along direction 33.

Exemplary Embodiment 6

Figure 12:
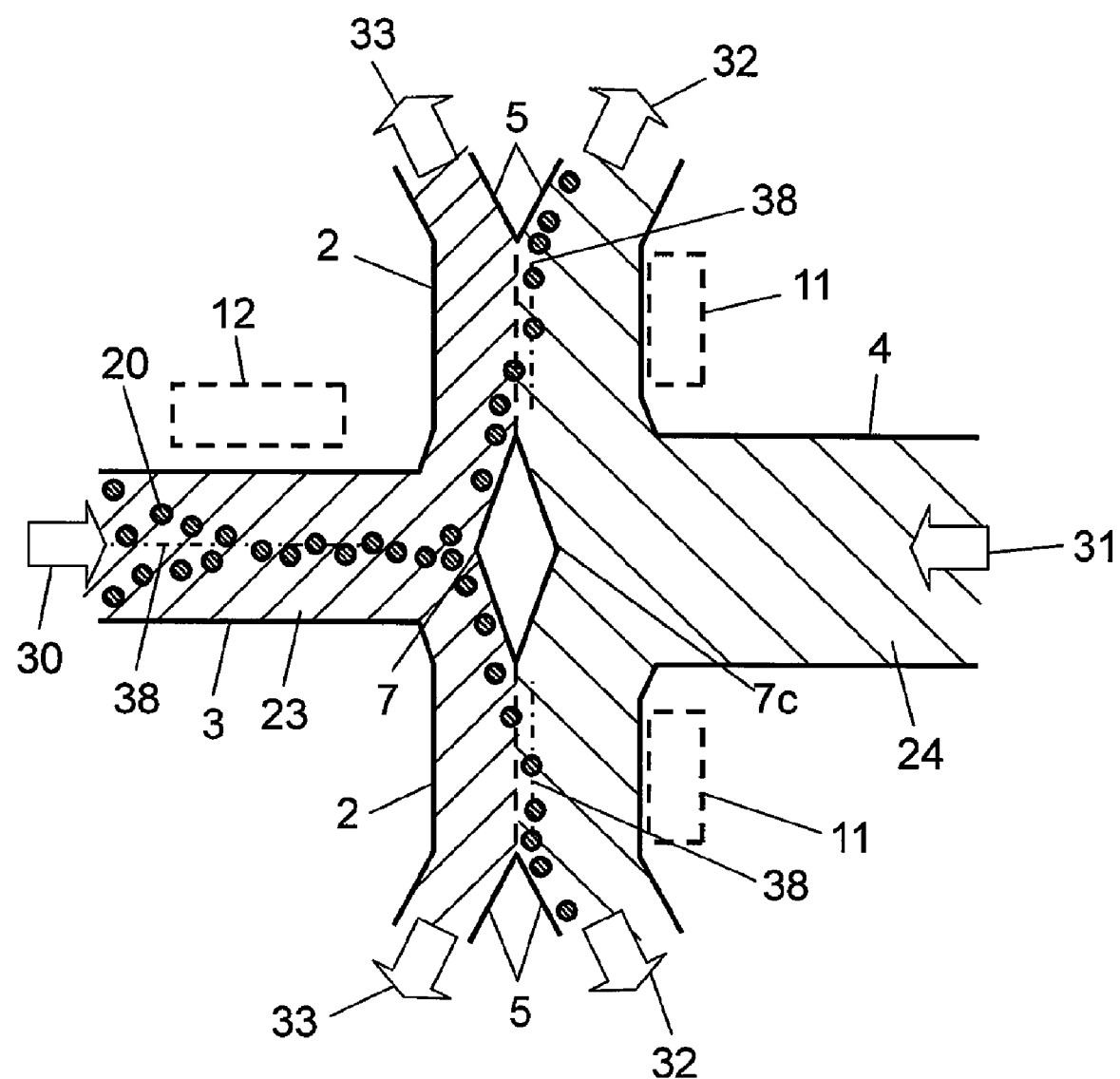
FIG. 12 is a plan view of a component separating device in accordance with Exemplary Embodiment 6 of the invention.
Figure 13:
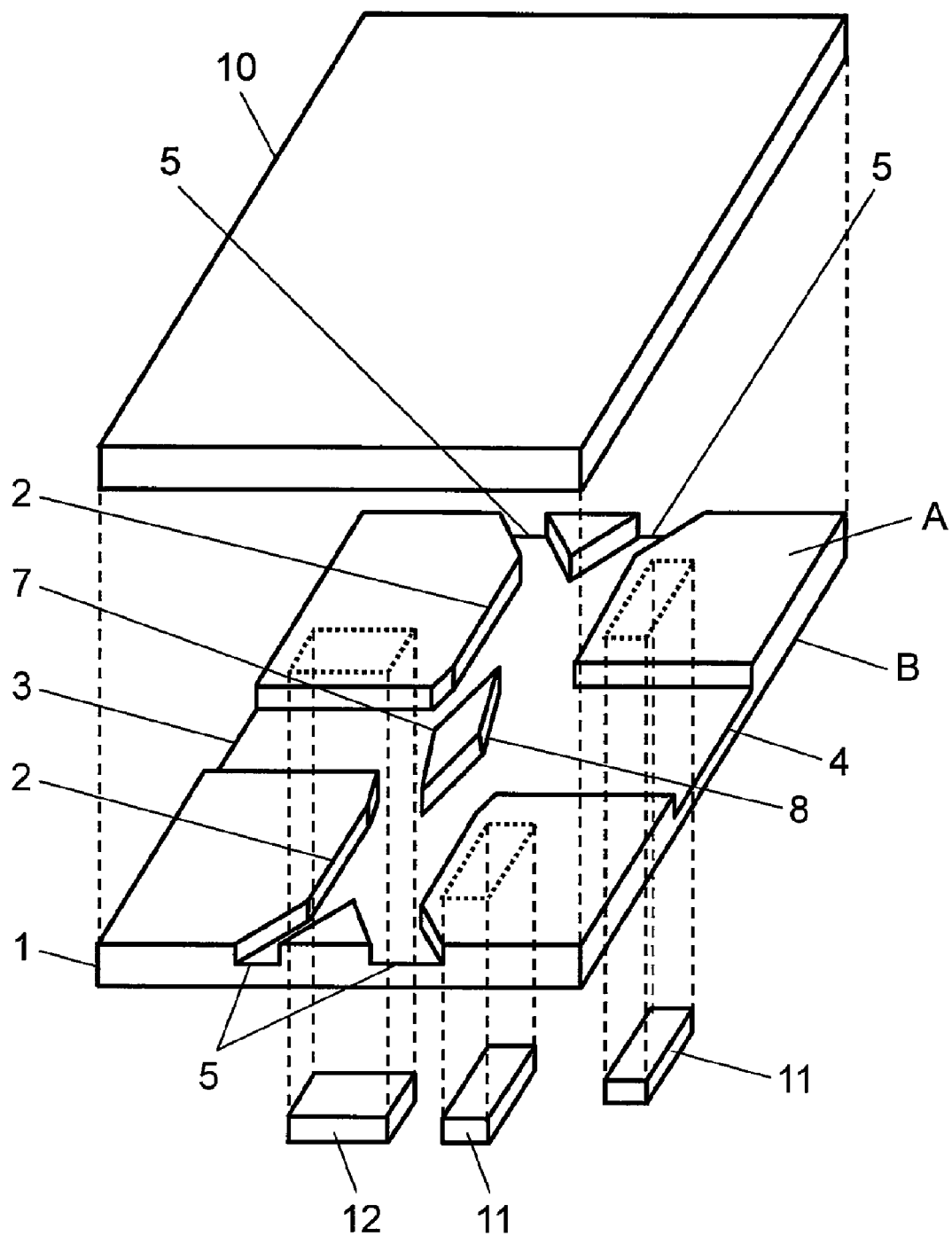
FIG. 13 is shows a perspective exploded view of the component separating device in accordance with Embodiment 6 of the invention.

A component separating device and a separating method with the device in accordance with Exemplary Embodiment 6 of the present invention will be described below with reference to FIGS. 12 and 13. FIG. 12 is a plan view of the component separating device. FIG. 13 is an exploded perspective view of the device. In FIGS. 12 and 13, the device has a structure basically identical to that of Embodiment 1, and components identical to those of Embodiment 1 are denoted by the same reference numerals. The device according to Embodiment 6 is different from the device of Embodiment 1 in a structure of branching and joining.

First inlet channel 3, first branching section 7, second inlet channel 4, second branching section 8, and plural outlet channels 5 are provided in a single surface of substrate 1. First inlet channel 3 introduces first solution 23 containing solid particles 20 into flow channel 2. First inlet channel 3 is branched at first branching section 7. Second inlet channel 4 introduces second solution 24. Second inlet channel 4 is branched at second branching section 8. Outlet channels 5 discharge solutions 23 and 24 from flow channel 2, respectively.

The above structure forms a density grade of particles 20 in first inlet channel 3. A flow of the region having solid particles 20 distributed at a higher density is branched at first branching section 7. The flow of the region and a flow of second solution 24 from second inlet channel 4 through second branching section 8 are introduced into flow channel 2. This operation forms an interface in flow channel 2 between the flow of the region of first solution 23 having particles 20 distributed at the higher density and the flow of second solution 24. Since solid particles 20 concentrate near the interface between the flows in the previous stage, solid particles 20 moves by short distances to be promptly separated and extracted from first solution 23 into second solution 24, thus increasing a collecting rate of solid particles 20.

The shapes of first and second branching sections 7 and 8 can be modified according to the shape, the size, and the weight of each solid particle 20. The cross sections of these branching sections can be linear, curved, or step shape.

In FIG. 12, first branching section 7 is located on the center line of first inlet channel 3, so that particles 20 on the center line shift to one side of the flow after the branching and flow into flow channel 2, where particles 20 join second solution 24. At this moment, particles 20 in first solution 23 shift to a side approximating to second solution 24. The width of the incoming flow of first solution 23 within flow channel 2 is larger than the width of the incoming flow of second solution 24 within flow channel 2. The width of flow channel 2 is equal to the sum of the widths of the incoming flows of solutions 23 and 24. Node 38 of the acoustic wave generated by acoustic wave generator 11 is located at the center of the flow channel. Therefore, solid particles 20 which have shifted to the side approximating to the flow at the joining point of first solution 23 and second solution 24 concentrate to node 38 by traveling by only a small distance. Particles 20 which concentrate are discharged together with second solution 24 from the outlet channels.

As discussed above, the density grade of particles 20 dispersing in first solution 23 flowing in first inlet channel 3 is formed. First branching section 7 branches the region having particles 20 distributed at a higher density. The flow having the density grade of particles 20 is introduced into flow channel 2. Second solution 24 is introduced from second inlet channel 4 facing first inlet channel 3 into flow channel 2 via second branching section 8. This structure forms a flow forming an interface in channel 2 between the region having the particles distributed at the higher and the flow of second solution 24. In flow channel 2, solid particles 20 are extracted and move from first solution 23 to second solution 24 where node 38 of the standing wave is located. Solid particles 20 can move to second solution 24 reliably by a small moving distance at a high collecting rate.

Exemplary Embodiment 7

Figure 14:
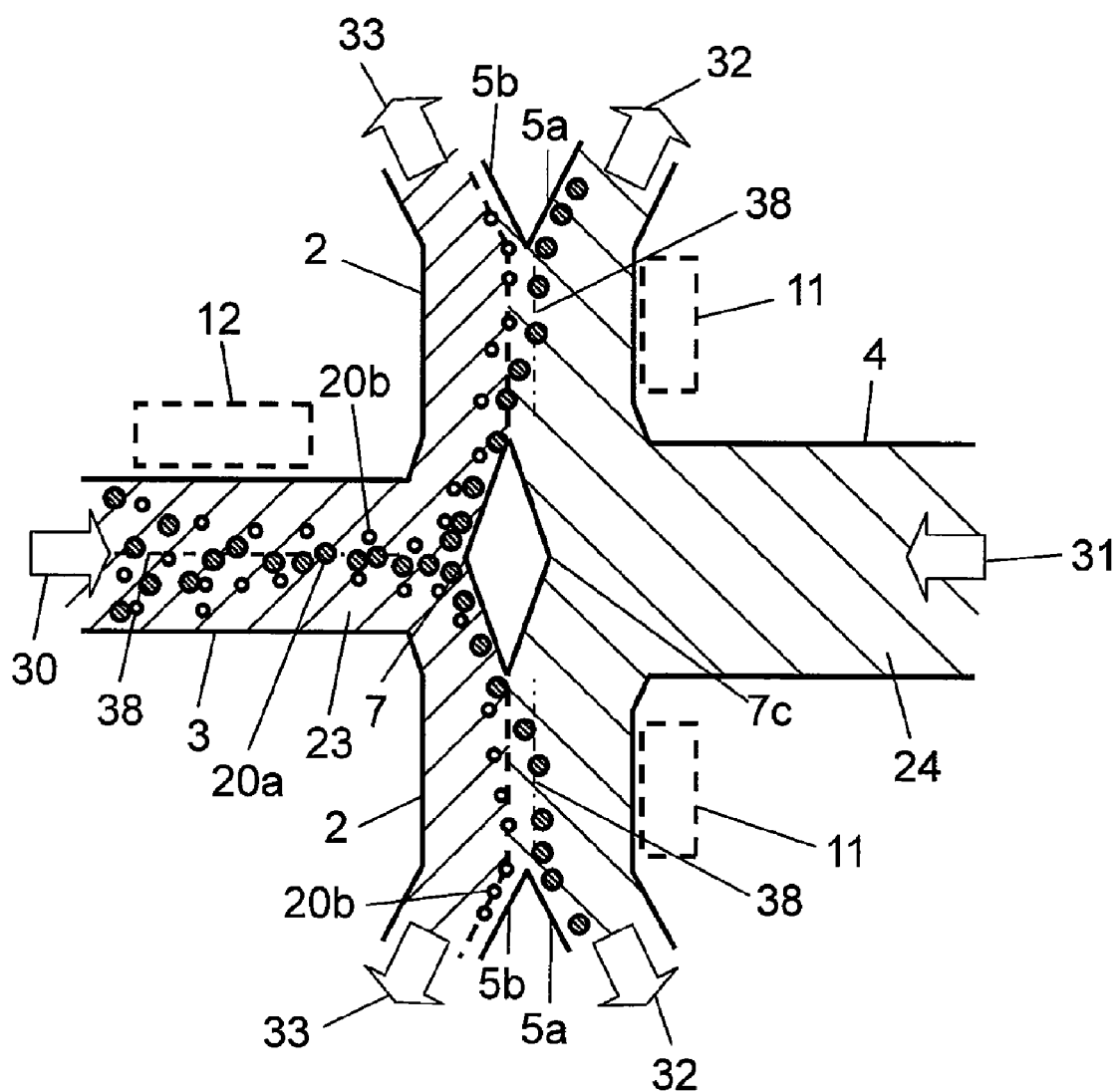
FIG. 14 is a plan view of a component separating device in accordance with Exemplary Embodiment 7 of the invention.
Figure 15:
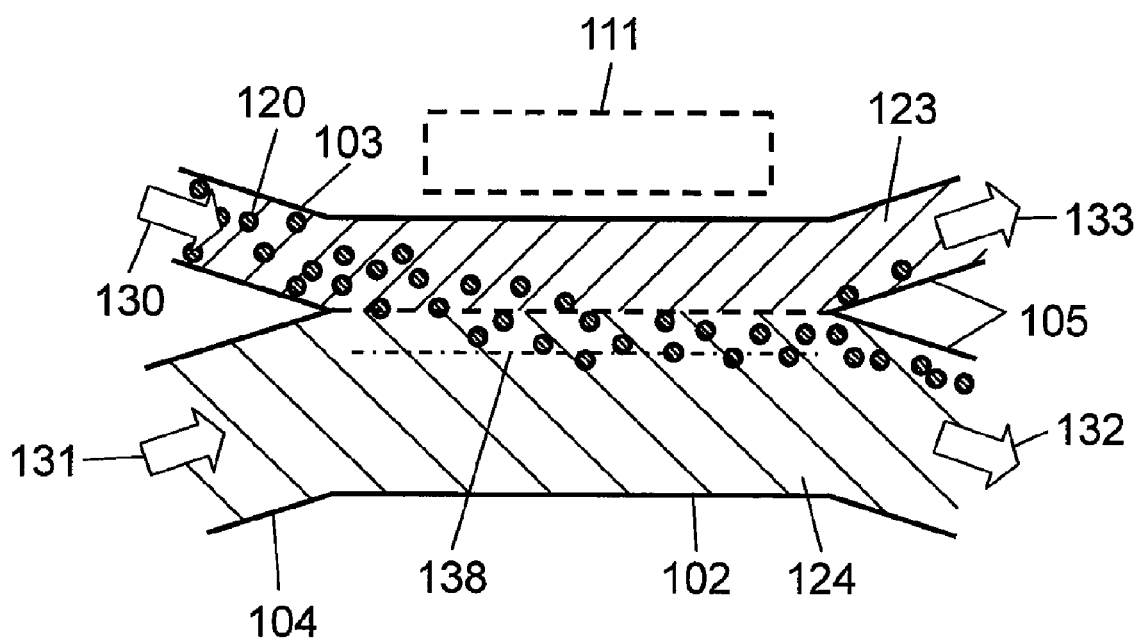
FIG. 15 is a sectional view of a conventional component separating device.

A component separating device in accordance with Exemplary Embodiment 7 of the present invention will be described below with reference to FIG. 14. FIG. 14 is a plan view of the component separating device. The device shown in FIG. 14 is basically similar to that of Embodiment 6 shown in FIGS. 12 and 13. The same components are denoted by the same reference numerals. The device according to Embodiment 7 is different from the device of Embodiment 6 in a structure for separating solid particles 20a having a larger volume from solid particles 20b having a smaller volume.

Solid particles 20a having a larger volume than solid particles 20b, and solid particles 20b having a smaller volume are mixed in a solution flowing in first inlet channel 3. Particles 20a and 20b concentrate to the center line of channel 3 as discussed in the device according to Embodiment 6. First branching section 7 is located on the center line. Both of the particles located on the center line shift to one side of the flow after being branched off into flow channel 2, where particles 20 join second solution 24. At this moment, particles 20 in first solution 23 shift to the side approximating to second solution 24. The width of an incoming flow of first solution 23 is larger than the width of an incoming flow of second solution 24. The width of flow channel 2 is the sum of the widths of the flows of solutions 23 and 24. Node 38 of the acoustic wave generated by acoustic wave generator 11 is located at the center of the flow channel. Solid particles 20 shifted to the side of the flow at joining portion of the solutions concentrate to node 38 by moving by only a short distance. Particles 20 concentrating are discharged together with second solution 24 from the outlet channels.

The moving speed and the response speed of the particles are different according to a volume of each solid particle. That is, a particle having a larger volume moves faster, i.e. first solid particle 20a moves faster than second particles 20b. Acoustic wave generator 11 in flow channel 2, first outlet channel 5, and flow channel 2 are set in the same conditions as those of Embodiment 5, thereby extracting one type of solid particles different in volume from the other type of particles, similarly to the device of Embodiment 5.

As discussed above, the device shown in FIG. 6 forms a density grade of at least first solid particles 20a in first inlet channel 3. Then, the region having particles 20a distributed at a high density flows in a channel branched by first branching section 7, and are introduced into flow channel 2. Second solution 24 introduced into flow channel 2 from second inlet channel 4 formed on the side having first branching section 7 provided therein. The region having particles 20a distributed at the high density flows while contacting second solution 24 in flow channel 2. First solid particles 20a are extracted from first solution 23 into second solution 24 in flow channel 2 on the next stage. This procedure allows reducing a moving distance and a dispersion of particles 20a, so that a high collecting rate of particles 20a can be expected. Respective particles 20a and 20b can be thus separated and extracted continuously from each other.

The component separating device shown in FIG. 14 and the separating method extract and separate the outstanding cells from cells having different shapes and sizes accurately for a short period of time. The device and the method thus can improve a measuring accuracy and speed during the analysis of the cells.

INDUSTRIAL APPLICABILITY

The present invention advantageously separates and extracts solid particles efficiently from mixture solution, such as cell culture, blood, or latex, containing the solid particles and solution, so that the present invention is useful as a pretreatment device for measuring characteristics of the solid particles.

The invention claimed is:
1. A component separating device comprising:
a flow channel;
an acoustic wave generator for generating an acoustic wave in the flow channel;
a first inlet channel which has an inlet for receiving a first solution containing solid particles and which introduces the first solution containing the solid particles into the flow channel;
a density grade generator for forming a density grade of the solid particles in the first inlet channel as to form a higher-density region at which the solid particles are located locally at a higher density in the first solution;
a second inlet channel for introducing a second solution into the flow channel, the second inlet channel being coupled with the first inlet channel at the flow channel;
a plurality of first outlet channels for discharging the introduced first solution and the introduced second solution from the flow channel; and
a second outlet channel connected to the first inlet channel, wherein
the first inlet channel has a first side surface connected to the second inlet channel, and
the second outlet channel is arranged to discharge a first portion of the first solution between the higher-density region and the first side surface of the first inlet channel from the first inlet channel.

2. The component separating device of claim 1, wherein the density grade generator is implemented by a further acoustic wave generator for generating an acoustic wave in the first inlet channel.

3. The component separating device of claim 2, wherein the further acoustic wave generator includes a layered piezoelectric device including a first electrode layer, a piezoelectric layer, and a second electrode layer.

4. The component separating device of claim 2, wherein the acoustic wave generator and the further acoustic wave generator are independently controlled.

5. The component separating device of claim 2, wherein standing waves different from each other are generated as the acoustic wave in the first inlet channel and the flow channel.

6. The component separating device of claim 1, wherein the acoustic wave generator includes a layered piezoelectric device including a first electrode layer, a piezoelectric layer and, a second electrode layer.

7. The component separating device of claim 1, wherein the second inlet channel is connected with a region of the first inlet channel having the solid particles distributed at the higher density so as to introduce the second solution into the region through the second inlet channel.

8. The component separating device of claim 7, further comprising a third inlet channel connected to a region of the flow channel having the solid particles distributed at the higher density so as to introduce the second solution into the region through the third inlet channel.

9. The component separating device of claim 1, wherein an inner diameter of the second outlet channel is smaller than an outer diameter of each of the solid particles.

10. The component separating device of claim 1, wherein the flow channel comprises a plurality of the flow channels, and
each of the flow channels is connected with the first inlet channel and the second inlet channel, the first inlet channel branching a region having the solid particles distributed at the higher density.

11. The component separating device of claim 10, wherein a number of the flow channels is identical to a number of the first inlet channels.

12. The component separating device of claim 1, wherein the second outlet channel is connected to the first side surface of the first inlet channel,
the first side surface of the first inlet channel has a first part which extends from the second outlet channel toward the inlet and a second part which extends from the second outlet channel to the flow channel, and a distance between the first higher-density region and the second part of the first side surface of the first inlet channel is shorter than a distance between the first higher-density region and the first part of the first side surface of the first inlet channel.

13. The component separating device of claim 1, wherein the second outlet channel comprises a plurality of outlet channels connected to the first inlet channel.

14. The component separating device of claim 1, further comprising
a third outlet channel connected to the first inlet channel, wherein
the first inlet channel further has a second side surface located opposite to the first side surface with respect to the first higher-density region, and
the third outlet channel is arranged to discharge a second portion of the first solution between the first higher-density region and the second side surface of the first inlet channel from the first inlet channel.

15. The component separating device of claim 14, wherein
the third outlet channel is connected to the second side surface of the first inlet channel,
the second side surface of the first inlet channel has a first part which extends from the third outlet channel toward the inlet and a second part which extends from the third outlet channel to the flow channel, and
a distance between the first higher-density region and the second part of the second side surface of the first outlet channel is shorter than a distance between the first higher-density region and the first part of the second side surface of the first inlet channel.

16. The component separating device of claim 14, wherein the third outlet channel comprises a plurality of outlet channels connected to the first inlet channel.

17. A component separating device comprising:
a first flow channel;
a first acoustic wave generator for generating an acoustic wave in the first flow channel;
a first inlet channel which has an inlet for receiving a first solution containing solid particles and which introduces the first solution containing the solid particles into the first flow channel;
a density grade generator operable to form a density grade of the solid particles in the first inlet channel as to form a first higher-density region at which the solid particles are located locally at a higher density in the first solution;
a second inlet channel for introducing a second solution into the first flow channel; and
a plurality of first outlet channels for discharging a solution from the first flow channel, wherein
the first inlet channel includes a first branch channel and a second branch channel branched at a first branching section which is located at the first higher-density region, and
the first branch channel has a side surface connected to the second inlet channel in the first flow channel, the side surface of the first branch channel extending from the first branch section to the second inlet channel.

18. The component separating device of claim 17, wherein the first inlet channel is joined with the second inlet channel at a joining point, and
a width of the second inlet channel at the joining point is larger than a width of the first inlet channel.

19. The component separating device of claim 17, wherein the second inlet channel is connected with a center of the first inlet channel in a width direction of the first inlet channel.

20. The component separating device of claim 17, wherein the density grade generator is implemented by a further acoustic wave generator for generating an acoustic wave in the first inlet channel.

21. The component separating device of claim 17, wherein
the second branch channel has a side surface connected to the second inlet channel at the first flow channel, the side surface of the second branch channel extending from the first branch section to the second inlet channel, and
the second inlet channel has a first side surface connected to the first branch channel and a second surface connected to the second branch channel.

22. The component separating device of claim 21, wherein the second surface of the second inlet channel is opposite to the first side surface of the second inlet channel.

23. The component separating device of claim 21, further comprising:
a second flow channel;
a third inlet channel for introducing a solution containing the solid particles from the first flow channel into the second flow channel;
a second acoustic wave generator for generating an acoustic wave in the second flow channel;
a fourth inlet channel for introducing a third solution into the second flow channel; and
a plurality of second outlet channels for discharging a solution from the second flow channel, wherein
the second acoustic wave generator is operable to form a density grade of the solid particles in the third inlet channel as to form a second higher-density region at which the solid particles are located locally at a higher density in the solution,
the third inlet channel includes a third branch channel and a fourth branch channel branched at a second branching section which is located at the second higher-density region, and
the third branch channel has a side surface connected to the fourth inlet channel at the second flow channel, the side surface of the third branch channel extending from the second branch section to the fourth inlet channel.

24. The component separating device of claim 23, wherein
the fourth branch channel has a side surface connected to the fourth inlet channel at the second flow channel, the side surface of the fourth branch channel extending from the second branch section to the fourth inlet channel, and
the fourth inlet channel has a first side surface connected to the third branch channel and a second surface connected to the fourth branch channel.

25. The component separating device of claim 24, wherein the second surface of the fourth inlet channel is opposite to the first side surface of the fourth inlet channel.

26. The component separating device of claim 17, further comprising:
a second flow channel; and
a second acoustic wave generator for generating an acoustic wave in the second flow channel, wherein
the second inlet channel includes a third branch channel and a fourth branch channel branched,
the side surface of the first branch channel is connected to the third branch channel at the first flow channel and extends from the first branch section to the third branch channel, and
the second branch channel has a side surface connected to the fourth branch channel at the second flow channel, the side surface of the second branch channel extending from the first branch section to the fourth branch channel.

* * * * *